United States Patent [19]
Yoshida et al.

[11] Patent Number: 6,064,163
[45] Date of Patent: May 16, 2000

[54] APPARATUS AND METHOD FOR CONTROLLING A DC BRUSH-LESS MOTOR BASED ON THE DUTY RATIO OR PULSE WIDTH OF A DETECTED PULSE

[75] Inventors: Makoto Yoshida, Kusatsu; Naomi Goto, Otsu, both of Japan

[73] Assignee: Matsushita Electric Industrial Co., Ltd., Osaka-fu, Japan

[21] Appl. No.: 09/129,995

[22] Filed: Aug. 6, 1998

[30] Foreign Application Priority Data

Aug. 11, 1997 [JP] Japan .................................. 9-216260

[51] Int. Cl.[7] ........................................ H02P 5/06
[52] U.S. Cl. ............................... 318/254; 318/439
[58] Field of Search .................... 318/254, 439, 318/138

[56] References Cited

U.S. PATENT DOCUMENTS

| | | | |
|---|---|---|---|
| 4,520,296 | 5/1985 | Lepper et al. | 318/254 |
| 4,743,815 | 5/1988 | Gee et al. | 318/254 |
| 4,912,378 | 3/1990 | Vukosavic | 318/254 |
| 4,928,043 | 5/1990 | Plunkett | 318/254 |
| 4,970,445 | 11/1990 | Kimura et al. | 318/254 |
| 5,339,013 | 8/1994 | Nakai et al. | 318/254 |

Primary Examiner—Jonathan Salata
Attorney, Agent, or Firm—Wenderoth, Lind & Ponack, L.L.P.

[57] ABSTRACT

An apparatus for controlling a DC brush-less motor includes a switching circuit which switches a DC voltage to convert the DC voltage into first pulses and a controller which controls the switching circuit. The controller has a voltage detector which detects a voltage of second pulses induced in the windings, a duty ratio control which controls a duty ratio of the first pulse depending upon the induced voltage detected by the voltage detector, and a carrier cycle control which controls a cycle of the first pulse depending upon the duty ratio or a width of the second pulse.

6 Claims, 6 Drawing Sheets

$\Delta x < \Delta y$

APPARATUS AND METHOD FOR CONTROLLING A DC BRUSH-LESS MOTOR BASED ON THE DUTY RATIO OR PULSE WIDTH OF A DETECTED PULSE

FIELD OF THE INVENTION

The present invention relates to an apparatus and method for controlling a DC brush-less motor and, in particular, the present invention relates to an apparatus and method for use in a voltage control for the DC brush-less motor by the Pulse Width Modulation (PWI).

BACKGROUND OF THE INVENTION

A highly effective DC brush-less motor using a permanent magnet in a rotor has been employed for driving a compressor in an air-conditioning system of an automobile or as driving means of an electric vehicle, for example. Typically, the DC brush-less motor is driven by a drive control system shown in FIG. 6. The drive control system employs the PWM for a voltage controll in which a position of the rotor is detected by a voltage induced in the motor.

Specifically, the drive control system, i.e., inverter, includes a switching circuit 11 for converting a DC voltage supplied from a DC power source $V_{DC}$ into a modulated voltage (PWM voltage) of a series of pulses, a controller 13a for controlling the switching circuit 11 and a position detector 14 for detecting a position of the rotor 9 in the motor 7. Typically, the position detector 14 is an analogue circuit, arid the controller 13a is a semiconductor LSI chip.

The inverter so constructed has two operational modes; a start mode used for starting the motor and a normal mode used for driving the motor in a stable state after the completion of the start mode. Disadvantageously, a voltage induced at the start mode in a winding 8 of a stator is too small to be well detected, which makes it difficult to detect a position of the rotor 9. Due to this, the inverter is designed so that, at the start mode, the controller 13a controls the switching circuit 11 irrespective of the position of the rotor 9 for varying the PWM voltage applied to the motor 7. Subsequently, once a rotational speed of the motor 7 has been increased to a predetermined speed, the operational mode is changed from the start mode to the normal mode.

In the normal mode, the position detector 14 detects the position of the rotor 9 from the voltage induced in the winding 8 of the stator. Based upon tile detected position of the rotor 9, the controller 13a controls the switching operation of the switching circuit 11 for controlling the PMW voltage. In this control, the PWM voltage is determined by a carrier cycle (pulse recurrence time) and a duty ratio of the PWM voltage, both of which being controlled by the controller 13a.

Preferably and advantageously, when controlling the motor by using the inverter, the carrier cycle in the PMW voltage control is reduced to, for example, about several decades to several hundreds micron meters in order to minimize the undesirable sound noises generated from the motor. Each pulse width in the PWM voltage is determined using the carrier cycle and the duty ratio. As a result, in order to drive the motor in a lower speed, the duty ratio as well as the pulse width needs to be minimized.

FIG. 7A shows a waveform of voltage applied to the winding 8 of a certain phase in the stator with respect to the negative terminal of the DC voltage $V_{DC}$. In the waveform, portions indicated by x and y correspond to the induced and applied voltages, respectively. FIG. 7B is an enlarged view of a part of the induced voltage, in which a series of voltage pulses are shown. As can be seen from FIG. 7B, each pulse of the induced voltage includes noises induced by an inductance of the winding 8 and floating capacities of switching elements A to F. Evidently, the noises provide the pulse with an adverse affect. This effect becomes problematic as the pulse width decreases.

To overcome this problem, the prior art position detector 14 is provided with an analogue filter circuit for removing the noises. The use of the analogue filter circuit, however, fails to ensure the stable performance of the position detector due to a frequency feature of the filter circuit and results in a time delay in the position detector.

Another method has been proposed for controlling the motor using a microcomputer in which a signal indicative of the induced voltage in the motor 7 is directly transmitted into the controller 13a, without passing through position detector 14. Hereinafter, this method will be referred to as "microcomputer based control". In this microcomputer based control, however, where the pulse at starting has a reduced width, the voltage variation due to the noise will make it difficult to precisely determine the induced voltage, i.e., pulse level.

Disadvantageously, incorporating the inverter controlled by the microcomputer into a compressor of the air-conditioning system of the automobile will increase the adverse affect, i.e., noise problem. One reason is that typically the inverter for the automotive air-conditioning system requires the reduced carrier cycle in PWM voltage control, compared with that used in another air-conditioning system for housing. For example, the air-conditioning system for electric vehicle requires a carrier cycle of about 100 $\mu$s while the air-conditioning system for housing requires a carrier cycle of about 250 $\mu$s. Another reason for that is that generally the automobile includes several sources that generate noises, such as driving inverter in the electric automobile and spark plugs in an internal combustion engine automobile.

In view of this, in the drive system using DC brush-less and sensor-less motor controlled by the microcomputer, a technique capable of precisely detecting the induced voltage in the motor, even under the existence of noises, has long been expected especially for the electric automobile and hybrid type electric automobile that employ the drive control system with the DC brush-less and sensor-less motor.

SUMMARY OF THE INVENTION

To overcome the above described problems, an object of the present invention is to provide an apparatus and method for controlling a DC brush-less motor, capable of precisely reading a voltage induced in a winding of a stator without being subject to an adverse affect provided by noises.

Accordingly, an apparatus for controlling a DC brush-less motor having a rotor of a permanent magnet and an associated stator with windings includes a switching circuit which switches a DC voltage to convert the DC voltage into a series of first pulses and a controller winch controls the switching circuit, thereby applying the series of first pulses to the windings to rotate the rotor. The controller has a voltage detector which detects a voltage induced in the windings according to a rotation of the rotor for detecting a position of the rotor or a number of revolutions of the rotor, the induced voltage being formed of a series of second pulses, a duty ratio control which controls a duty ratio of the first pulse depending upon the induced voltage detected by the voltage detector, and a frequency control which controls a cycle of the first pulse depending upon the duty ratio or a width of the second pulse.

In another aspect of the present invention, the frequency control extends the cycle of the first pulse when the duty ratio or the second pulse width decreases to a value less than a respective predetermined value.

In another aspect of the present invention, the frequency control extends the cycle of the first pulse when the duty ratio or the second pulse width decreases to a value less than first predetermined respective values and reduces the cycle of the first pulse when the duty ratio or the second pulse width is increased to a value more than a respective second predetermined value.

A method for controlling a DC brush-less motor includes the steps of (a) detecting a level of a first pulse induced in a winding of a stator according to a rotation of a rotor;

(b) controlling a duty ratio of a second pulse to be applied to the winding based upon the detected level of the first pulse; and (c) changing a cycle of the second pulse depending upon the duty ratio or a width of the induced first pulse.

In another aspect of the controlling method according to the present invention, the step (c) includes extending a width of the second pulse when the duty ratio or the first pulse width decreased less than predetermined value.

In a further aspect of the controlling method according to the present invention, the step (c) includes extending a width of the second pulse when the duty ratio or the first pulse width decreases to a value less than a first respective predetermined value and reducing the cycle of the second pulse when the duty ratio or the first pulse width increased more than second predetermined respective value.

DETAILED DESCRIPTION OF THE PREFERRED EMBODIMENTS

Figure 1:
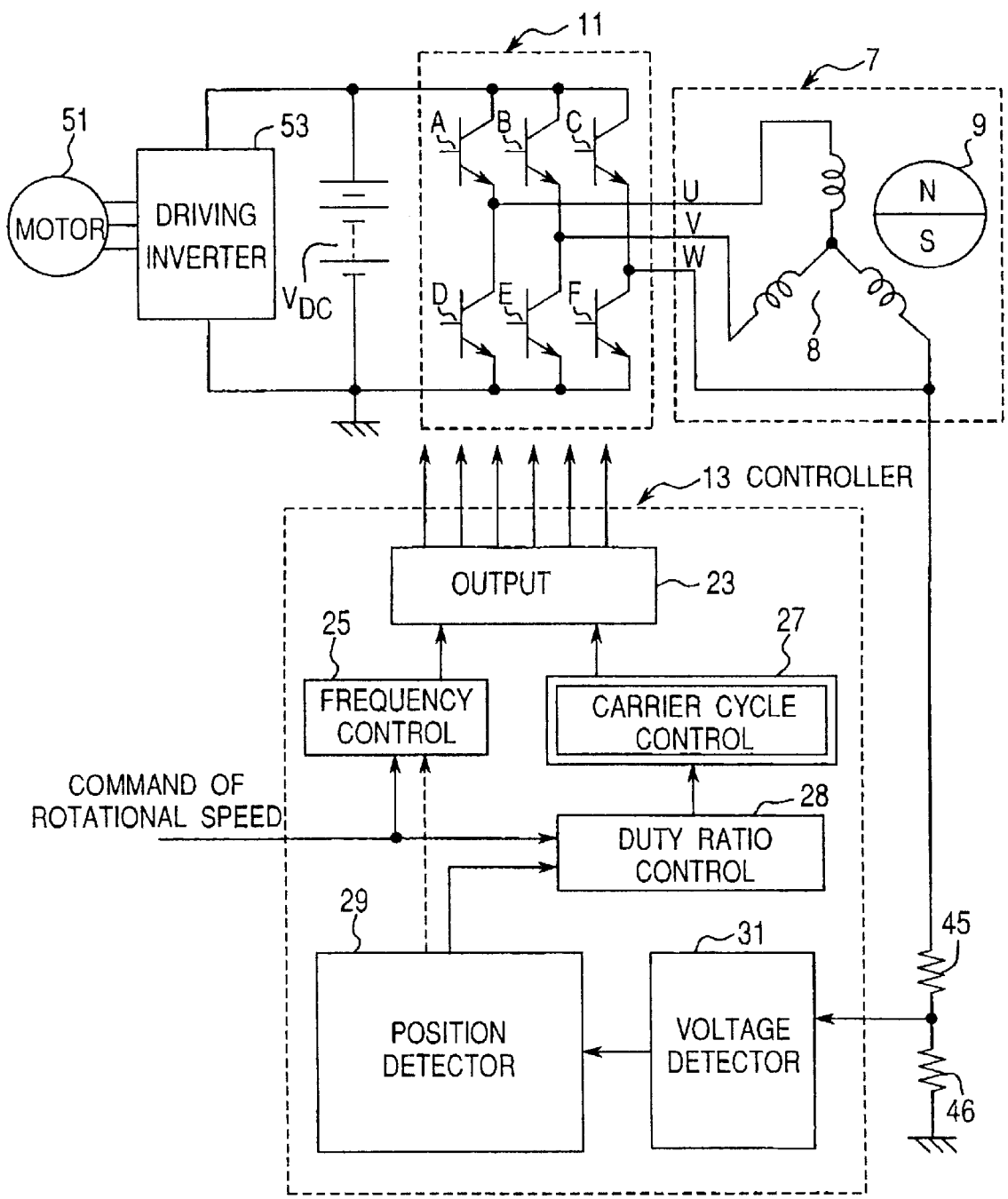
FIG. 1 is a schematic block diagram of a drive control system for a DC brush-less motor of a preferred embodiment of the present invention.

Referring to the drawings, particularly in FIG. 1, there is shown a schematic block diagram of a drive control system of, for example, an electric automobile having a DC brush-less motor 7. The drive control system, referred to as inverter hereinafter, has a switching circuit 11 and a control circuit 13. The switching circuit 11 includes several pairs of switching elements, i.e., transistors, A and D, B and E and C and F. The control circuit 13 includes an output control 23, a frequency control 25, a carrier-cycle control 27, a duty-ratio control 28, a rotational position detector 29 and a voltage detector 31. Intermediate portions (i.e., connected portions) of switching-element pairs in the switching circuit 11 are further communicated with associated windings 8 in U-, V- and W-phases of a stator, respectively, in the DC brush-less motor. The inverter is communicated with a DC power source $V_{DC}$. The DC power source $V_{DC}$ is in turn communicated in a parallel fashion with another inverter 53 for controlling a drive motor 51. One end of the winding in W-phase of the motor 7 is grounded via resistances 45 and 46 arranged in series.

With this arrangement of the inverter, a signal or information indicative of a phase of a rotor 9 in the motor 7 is directly transmitted into the control circuit 13. In contrary to this, in the prior art inverter, the phase signal is transmitted through a certain circuit such as position detector.

In operation of the inverter so constructed, upon receiving a control signal from the control circuit 13, the switching elements A to F in the switching circuit 11 are switched, which controls a voltage, i.e., a Pulse Width Modulation (PWM) voltage, to be applied to the motor 7.

Figure 2:
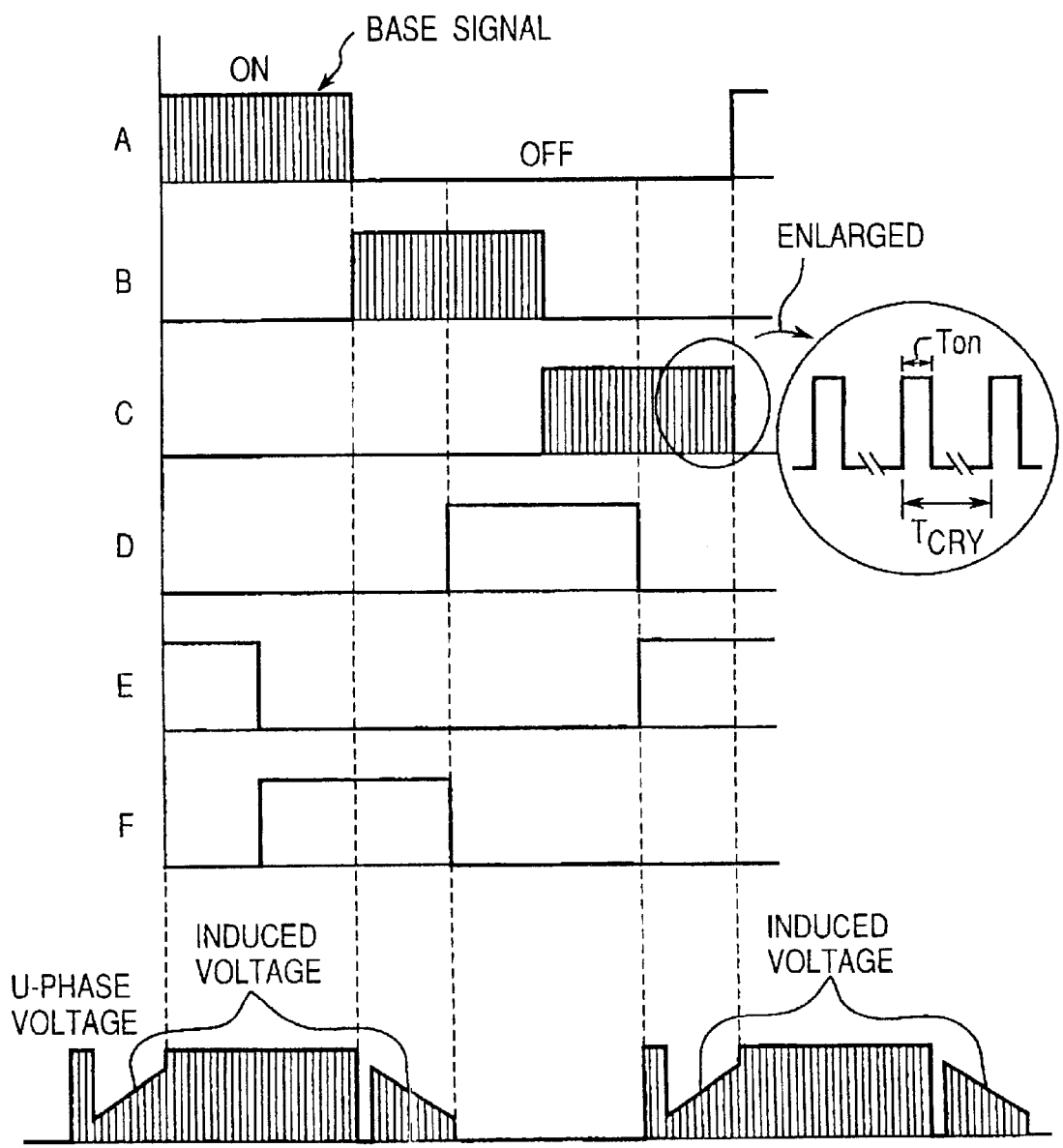
FIG. 2 shows waveforms of base signals and induced voltages in a switching circuit.

Specifically, bases of the switching elements or transistors A to F are supplied with base signals, respectively, shown in FIG. 2. Each of the switching elements A to F is switched on when the base signal is in the high level and switched off when the base signal is in the low level. A duty ratio of the base signal is controlled. $T_{CRY}$ represents a carrier cycle (pulse recurrence time) of each of a series of pulses forming the base signal. $T_{ON}$ represents a time period, i.e., pulse width, during which the switching element is turned on. The duty ratio D can be represented by the following equation:

$$D=[T_{ON}/T_{CRY}]/100(\%)$$

The carrier cycle $T_{CRY}$ is controlled by the carrier cycle control 27 in the controller 13 and the duty ratio D is by the duty ratio control 28. Rotational speed, i.e., rotational frequency, of the motor 7 is controlled by the frequency control 25.

Descriptions will be made to the operations of respective parts in the controller 13. Similar to the prior art, the inverter of the present invention has a start mode and a normal mode.

In the start mode, rotation of the motor 7 is started while the duty ratio, carrier cycle, and rotational frequency are controlled irrespective of the position of the rotor 9. A Lime required for the start mode is significantly shorter than that for the normal mode which will be described below.

In the normal mode, a signal indicative of a predetermined rotational frequency based upon which the motor 7 will be controlled, is transmitted to the control circuit 13. Based upon the signal, the frequency control 25 controls the frequency of the voltage application to the windings 8 and, thereby, the rotational frequency of the motor 7 is controlled.

Specifically, the frequency control 25 transmits a control signal for controlling the frequency of the base signal according to the command of rotational speed into the output control 23. The voltage detector 31 is supplied with an induced voltage that has been generated in the winding 8 of the stator and then divided by the resistances 45 and 46. The induced voltage is converted into a digital signal, which is then transmitted to the position detector 29. The position detector 29 determines the position of the rotor 9 using the signal transmitted from the voltage detector 31. Also, based upon the voltage variation, the rotational speed of the rotor 9 is determined. The duty ratio control 28 controls the duty ratio according to the position of rotor detected by the position detector 29, thereby correcting the position of the rotor. The carrier cycle control 27 controls the carrier cycle of the pulses of the base signal according to the output from the duty ratio control 28, the control of which will be described in detail later. The output control 23 provides the switching circuit 11 with the base signals based upon control signals both from the frequency control 25 and carrier cycle control 27 for controlling the switching of the switching elements A to F.

In view of this, the inverter provides the microcomputer-based control in which the signal indicative of the position (i.e., phase) of the rotor 9 of the motor 7 is directly transmitted to the control circuit 13. Therefore, it is necessary to solve the problem of noises is carried with the induced voltage described above. For this purpose, the carrier cycle is varied at the carrier cycle control 27 in this embodiment, which will be described in detail below.

Figure 3:
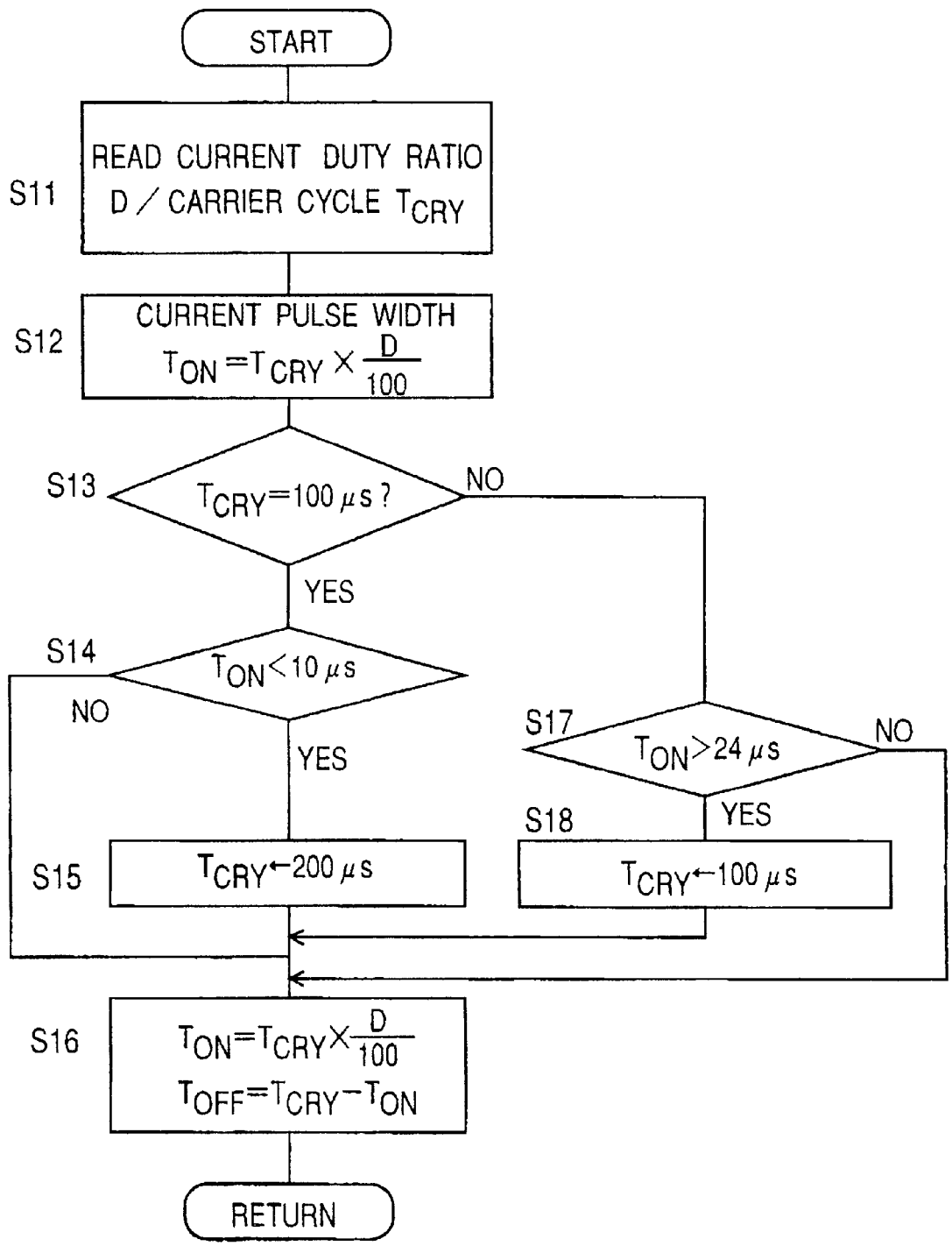
FIG. 3 is a flowchart which shows a program carried out in a carrier cycle control.

FIG. 3 is a flowchart showing the operation of the carrier cycle control 27. Based upon the output from the duty ratio control 28, the carrier cycle control 27 reads in the current duty ratio D (%) and carrier cycle $T_{CRY}$ (μs) (at step 11). Typically, it is preset that the carrier cycle ranges from about 100 to 200 μs while the duty ratio is at least about 5%. After reading in the duty ratio and the carrier cycle, the current pulse width of the induced voltage is determined (at step 12). In this instance, the pulse width of the induced voltage equals that of the applied voltage and calculated by the following equation:

$$T_{ON}=D[T_{CRY}/100]$$

Subsequently, it is determined at step 13 whether the carrier cycle $T_{CRY}$ equals to 100 μs. If the carrier cycle $T_{CRY}$ equals to 100 μs, i.e., if Yes at step 13, another determination is made at step 14 whether the pulse width $T_{ON}$ is less than a first threshold. In this embodiment, the first threshold is preset to 10 μs. If the pulse width $T_{ON}$ is less than a first threshold, i.e., if Yes at step 14, the carrier cycle is set to 200 μs (at step 15) and then the program proceeds to step 16.

Figure 4A:
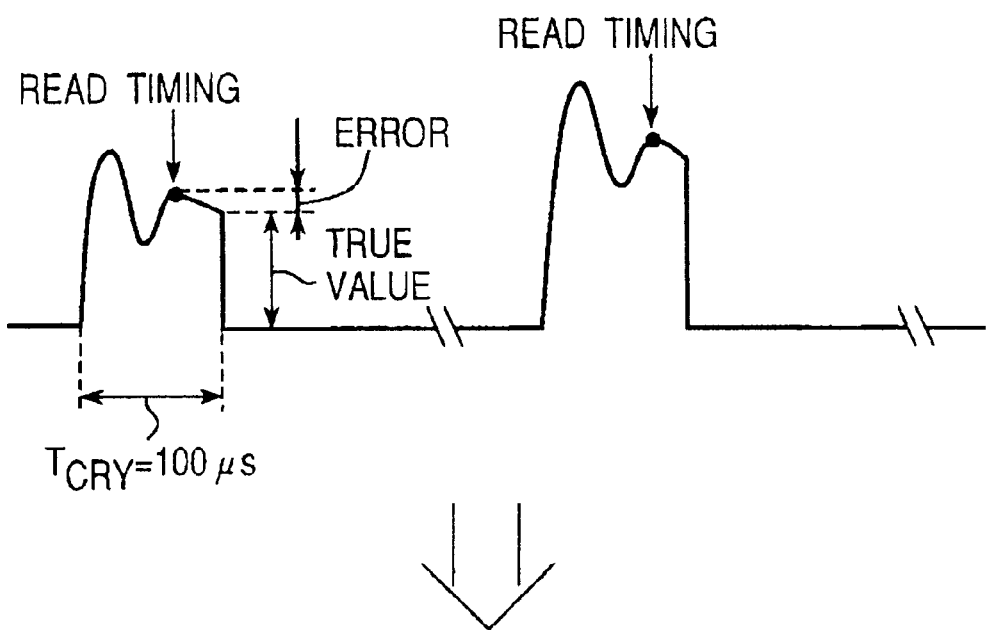
FIG. 4A shows pulses of the induced voltage.
Figure 4B:
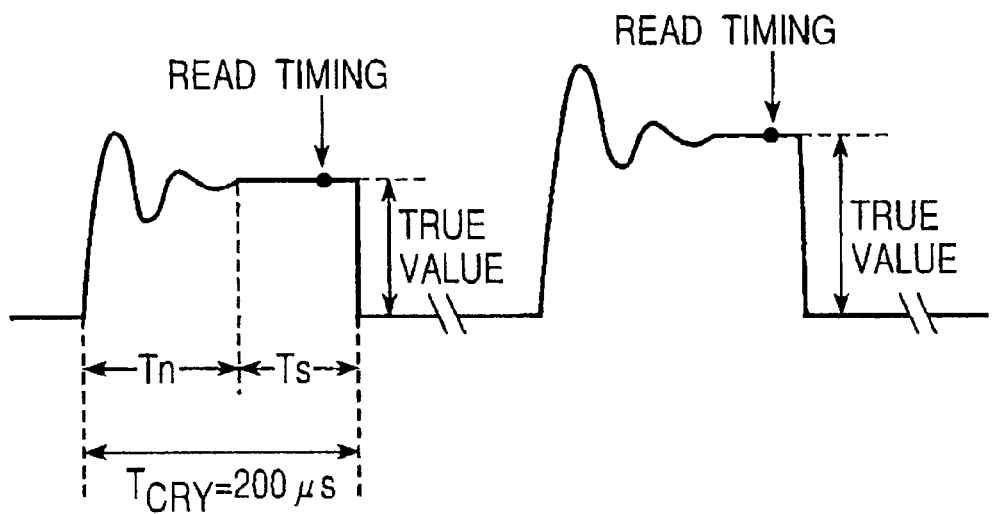
FIG. 4B shows pulses of the induced voltages in which each pulse is extended in width.

As described above, when the pulse width of the induced voltage pulse is narrow and thereby it is susceptible to the noises as shown in FIG. 4A, the inverter increases the pulse width by increasing the carrier cycle $T_{CRY}$ as shown in FIG. 4B. This ensures that a time zone $T_s$ is formed in which no noise provides any variation to the induced voltage. Therefore, the induced voltage can be determined precisely by reading the same, i.e., true value, in the time zone $T_s$ at the control circuit 13.

If the carrier cycle is not 100 μs, i.e., if No at step 13, another determination is made at step 17 whether the pulse width $T_{ON}$ is less than a second threshold. In this embodiment, the second threshold is preset to 24 μs. Note that the second threshold (24 μs) is preset to be larger than the first threshold (10 μs). Then, if the pulse width $T_{ON}$ is larger than the second threshold, i.e., if Yes at step 17, the carrier cycle $T_{CRY}$ is set to be 100 μs (at step 18), then the program proceeds to step 16. At step 16, based upon the carrier cycle $T_{CRY}$, the pulse width $T_{ON}$ and the turn-off time $T_{OFF}$ (=$T_{CRY}$-$T_{ON}$) is calculated. The carrier cycle control 27 repeats the above mentioned processes every predetermined time period and, thereby, changing the carrier cycle, which eliminates the adverse affect of the noises.

It should be noted that at steps 14 and 17, the pulse width is compared with the first and second thresholds, respectively. The purpose of which is to provide the pulse width with a hysteresis feature. It should be noted that the process of step 16 may be eliminated from the program so that the carrier cycle is determined only by using the first threshold (10 μs).

In the previous control, the pulse width is compared with the thresholds at steps 14 and 17 and, based upon the comparison results, the carrier cycle is changed. Alternatively, due to the fact that the pulse width is proportion to the duty ratio, the duty ratio may be compared with the predetermined duty ratios and, based upon the comparison results, the carrier cycle is changed which leads the same result as the previous embodiment.

Discussions will be made to the setting of the carrier cycle $T_{CRY}$. In FIG. 4b, $T_n$ represents a time zone in which a vibration component derived from the noises predominates, which $T_n$ is referred to as noise time hereinafter. On the other hand, $T_s$ represents the time zone from when most of the voltage vibration of noises is damped off to when the pulse is turned off, which is referred to as stable time hereinafter. Also, in the stable time $T_s$, the true value or almost true value of the induced voltage can be obtained. Therefore, the control circuit 13 reads in the induced voltage in this stable time $T_s$. To this end, when the pulse width is reduced and, then, the stable time $T_s$ is decreased almost to zero in which it is impossible to read the precise induced voltage, the inverter extends the pulse width to increase the stable time $T_s$. Note that the carrier cycle $T_{CRY}$ is expressed using the pulse width $T_{ON}$ and the duty ratio D in the following equation:

$$T_{CRY}=100[T_{ON}/D]$$

To ensure a necessary stable time $T_0$, the pulse width $T_{ON}$ is required to be larger than noise time $T_n$. For this purpose, the carrier cycle $T_{CRY}$ is determined to meet the following relation:

$$T_{CRY}=100[T_{ON}/D]>100D$$

Figure 5:
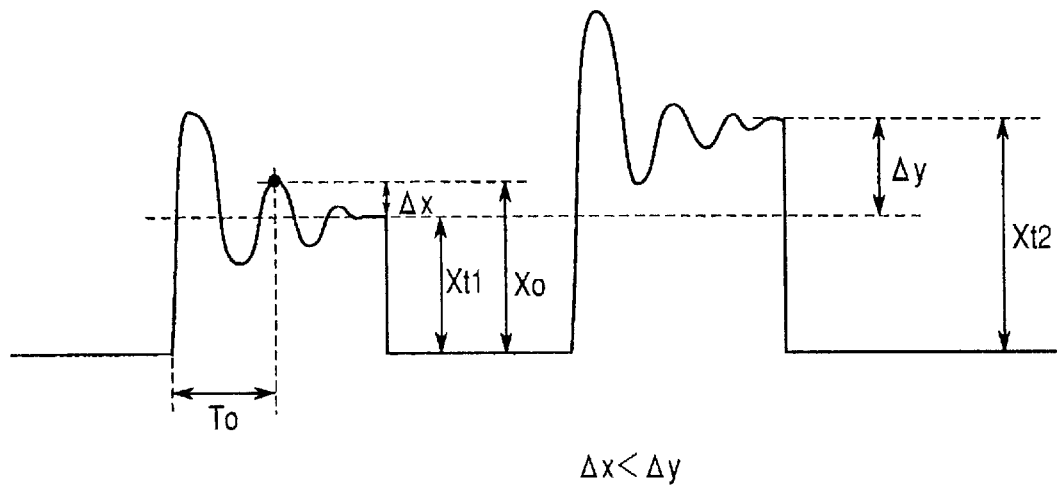
FIG. 5 shows waveforms of the induced voltage for describing how to determine a noise time $T_n$.
Figure 6:
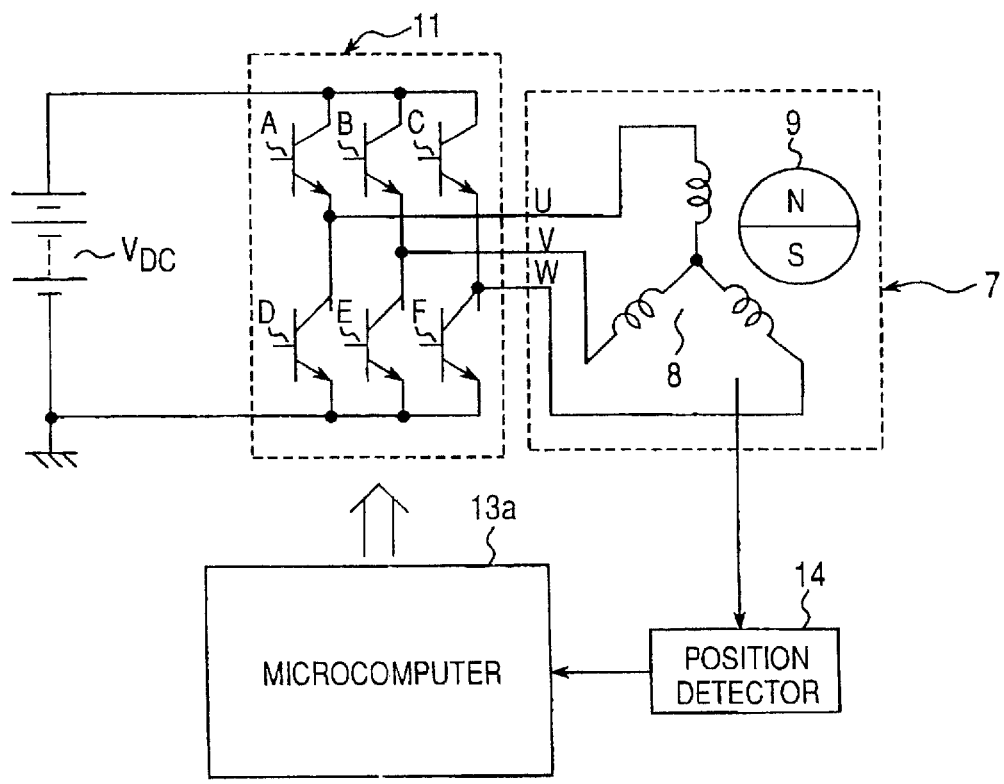
FIG. 6 is a schematic block diagram which shows a conventional drive control system for the DC brush-less motor.
Figures 7A, 7B:
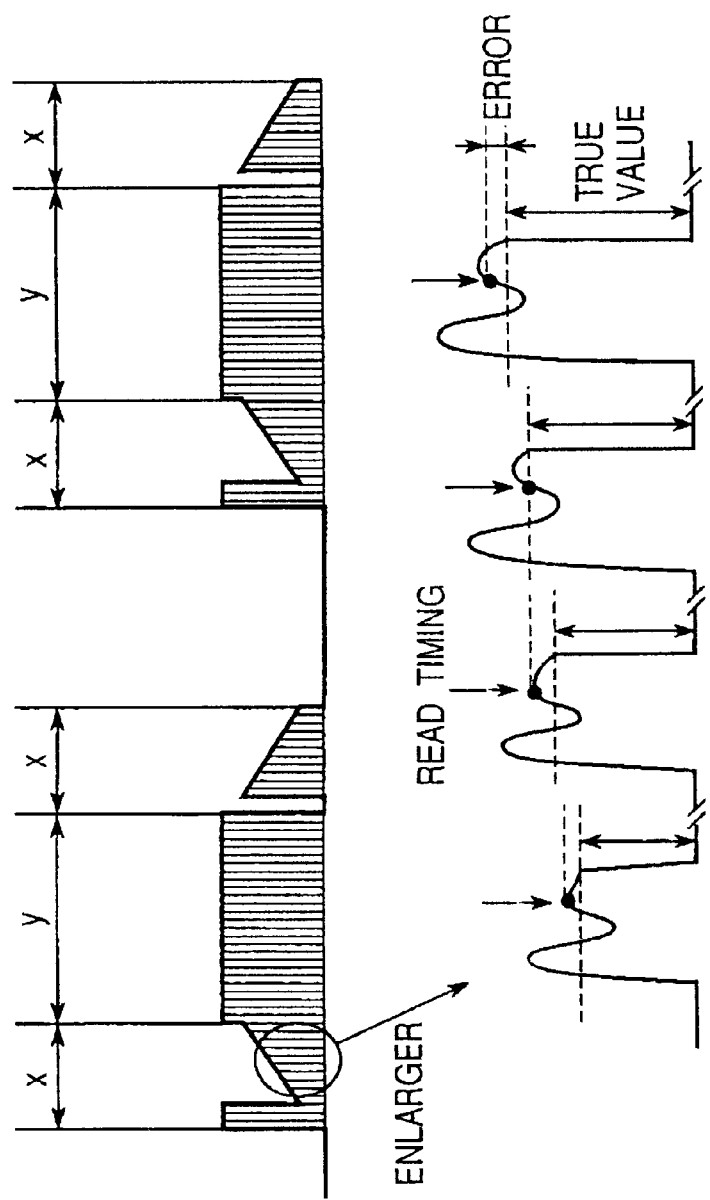
FIG. 7A shows waveforms of voltage in a U-phase of the motor.
FIG. 7B shows waveforms of enlarged pulses in an induced voltage.

For example, the noise time $T_n$ can be determined in a manner described below. FIG. 5 shows a waveform of the induced pulses. In this drawing, $X_0$ represents a pulse level at a certain time when a time $T_0$ has passed from the leading edge of the pulse, $X_{t1}$ represents the true value (true level) of the pulse, and $\Delta X$ represents an absolute difference of between $X_0$ and $X_{t1}$, which is expressed as follows:

$$\Delta X=|X_0-X_{t1}|$$

In this instance, for each pulse the noise time $T_n$ can be defined as a time that satisfies the following relation after $T_0$:

$$\Delta X<\Delta Y$$

By so defining the noise time $T_n$, not only information indicative of whether the induced voltage is increasing or decreasing but also information indicating that the noise is reduced to almost, zero can be obtained.

Alternatively, the noise time $T_n$ may be defined as a time from when the time $T_0$ has passed from the leading edge of the pulse to when a voltage difference of between the pulse voltage and the true voltage falls within a certain range.

Typically, in this embodiment, the noise time $T_n$ so defined will be about 8 μs.

The first threshold presented at step 13 may be determined using the noise time $T_n$. Note that, the sufficient stable Lime $T_n$ for ensuring the reading of the true value is not obtained if the pulse width $T_{ON}$ is less than the noise time $T_n$. For this reason, the first threshold should be determined to meet the following relation:

$$\text{First threshold}>T_n$$

As described above, with the inverter of embodiment, the carrier cycle is extended when the carrier cycle control 27 is unable to precisely read the induced voltage because of the reduction of the pulse width or duty ratio, i.e., predominance of the noises in the pulse. As shown in FIG. 4, the extension of the pulse width of the induced voltage increases the time period during which the true value can be determined. This allows the level of the induced voltage pulse to be precisely determined in the extended time without being subject to any adverse affect due to the noises.

With the inverter described in the previous embodiment, the duty ratio control 28 controls the duty ratio according to the required or predetermined rotational frequency and the position of the rotor 9, and the frequency control 25 controls the application of voltage to the windings 8 of the stator based upon the required rotational frequency, thereby controlling the actual frequency of the motor 7.

In contrary to this, the duty ratio may be controlled by the duty ratio control 28 based upon the required rotational frequency and actual rotational frequency detected by the position detector 29, and the rotational frequency of the motor 7 may be controlled by the frequency control 25 based upon the position of the rotor 9 detected by the position detector 29, thereby controlling the rotational frequency of the motor 7. In this instance, by changing the carrier cycle according to the pulse width and the duty ratio of the induced voltage, the induced voltage can be precisely determined irrespective of the noises.

According to the drive control system for the DC brush-less motor according to the present invention, the pulse width is extended by increasing the carrier cycle when the duty ratio or the pulse width of the pulse of voltage induced in the motor stator is smaller than a predetermined value. This allows the microcomputer based control to read the induced voltage precisely without being affected by the noises. Also, this enables the controller to directly read the induced voltage, not via the position detector, providing a small-sized and low-cost drive control system. Further, the induced voltage can be detected without any delay which would be problematic in the analogue circuit, which ensures to provide a greater precise control, efficiency, and starting performance to the drive control system.

It will, of course, be understood that various modifications and additions can be made to the preferred embodiments discussed hereinabove without departing form the scope or spirit of the present invention. Accordingly, the scope of the present invention should not be limited by the particular embodiments described above, but should be defined only by the claims set forth below and equivalents thereof.

What is claimed is:

1. A drive control system for use with a DC brush-less motor having a rotor of a permanent magnet and an associated stator with windings, said drive control system comprising:

a switching circuit operable to switch a DC voltage to convert the DC voltage into a series of first pulses; and a controller operable to control said switching circuit so as to apply the series of first pulses to the windings to rotate the rotor;

said controller comprising a voltage detector operable to detect a voltage induced in the windings according to a rotation of the rotor for detecting a position of the rotor or a number of revolutions of the rotor, wherein the induced voltage is formed of a series of second pulses;

a duty ratio control operable to control a pulse duty ratio of the first pulses depending upon the induced voltage detected by said voltage detector; and a carrier cycle control operable to control a pulse cycle of the first pulses depending upon the pulse duty ratio or a pulse width of the second pulses.

2. A system claimed in claim 1, wherein said carrier cycle control is operable to extend the pulse cycle of the first pulses when the pulse duty ratio or the pulse width of the second pulses decrease to less than predetermined respective values.

3. A system claimed in claim 1, wherein said carrier cycle control is operable to extend the pulse cycle of the first pulses when the pulse duty ratio or the pulse width of the second pulses decrease to less than first predetermined respective values and to reduce the pulse cycle of the first pulse when the pulse duty ratio or the pulse width of the second pulses increase to more than second predetermined respective values.

4. A method for use in controlling a DC brush-less motor including a rotor and a stator having a winding, said method comprising:

detecting a level of a first pulse induced in a winding of the stator according to a rotation of the rotor;

controlling a duty ratio of a second pulse to be applied to the winding based upon the detected level of the first pulse; and changing a cycle of the second pulse depending upon the duty ratio or a width of the induced first pulse.

5. A method claimed in claim 4, wherein said changing of a cycle includes extending a width of the second pulse when the duty ratio or the width of the first pulse decrease to less than predetermined respective values.

6. A method claimed in claim 4, wherein said changing of a cycle includes extending a width of the second pulse when the duty ratio or the width of the first pulse decrease to less than first predetermined respective values and reducing the cycle of the second pulse when the duty ratio or the width of the first pulse increase to more than second predetermined respective values.

* * * * *